G. KAWASAKI.
AUTOMOBILE FENDER.
APPLICATION FILED JULY 19, 1917.
1,259,523.
Patented Mar. 19, 1918.
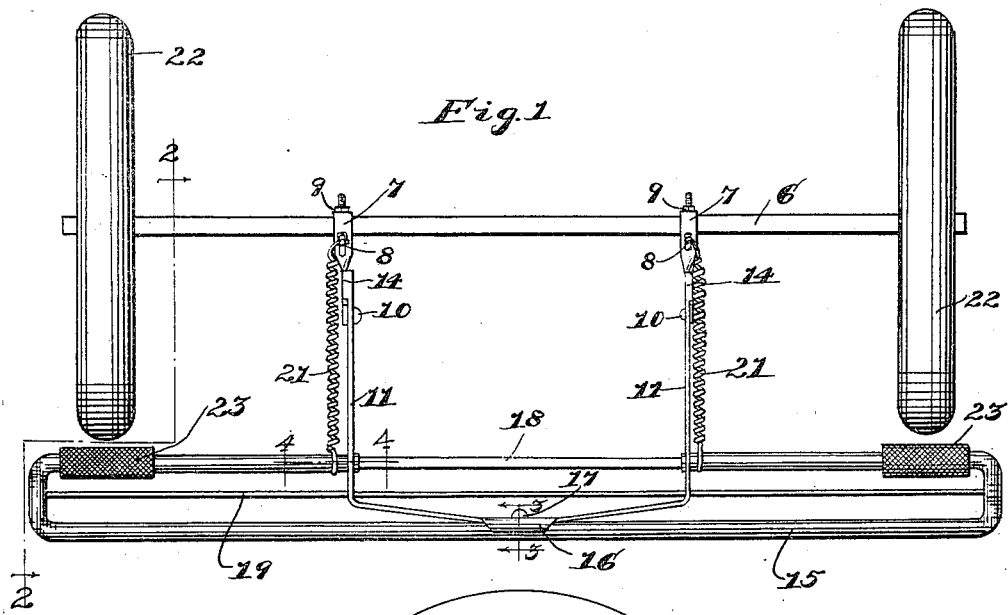
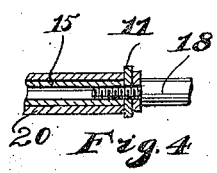
Fig. 4
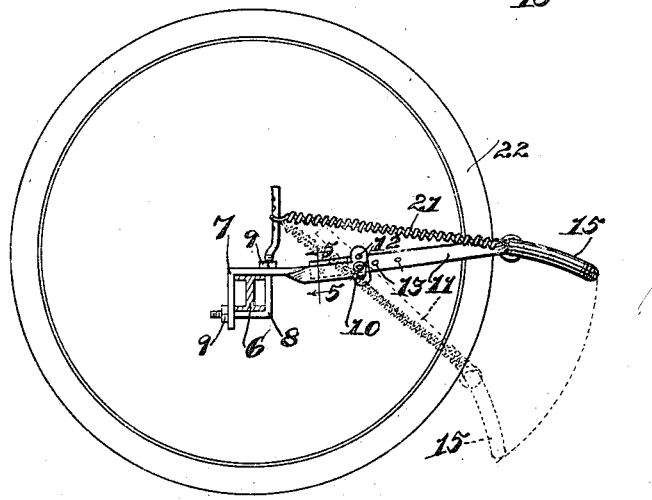
Fig. 2
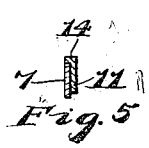
Fig. 5
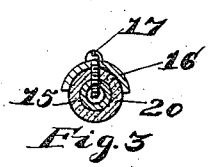
Fig. 3
Witnesses
Willis King
A. A. Olin
Inventor
Goro Kawasaki
By Joshua R. H. Potter
his Attorney

UNITED STATES PATENT OFFICE.

GORO KAWASAKI, OF CHICAGO, ILLINOIS.

AUTOMOBILE-FENDER.

1,259,523.   Specification of Letters Patent.   Patented Mar. 19, 1918.

Application filed July 19, 1917. Serial No. 181,431.

*To all whom it may concern:*

Be it known that I, GORO KAWASAKI, a subject of the Emperor of Japan, and a resident of the city of Chicago, county of Cook, and State of Illinois, have invented certain new and useful Improvements in Automobile-Fenders, of which the following is a specification.

My invention relates to improvements in vehicle fenders, and has for its object, the production of a device of this character which will be of durable and economical construction, one which may be readily and easily attached or detached, and one which will be highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a top plan view of the front end portion of a conventional vehicle, diagrammatically illustrated, to which is attached a fender embodying the invention.

Fig. 2, a section taken on line 2—2 of Fig. 1,

Fig. 3, an enlarged section taken on line 3—3 of Fig. 1,

Fig. 4, an enlarged section taken on line 4—4 of Fig. 1, and

Fig. 5, an enlarged section taken on line 5—5 of Fig. 2.

The preferred form of construction, as illustrated in the drawings, comprises a pair of clamping devices whereby the fender may be attached to the front axle 6 of the vehicle in connection with which the fender is employed. Each of these devices comprises two angularly formed clamping members 7 and 8, the member 7 having elongated slots for engagement with the ends of the member 8 which project therethrough. The elongated slots of course permit of adjustment of the clamp to various sizes of axles. Said clamping devices are locked in clamping relation by means of nuts 9.

The clamp members 7 project forwardly and are pivotally connected at their outer ends, as at 10, with the ends of a substantially U-shaped supporting member or lever 11 preferably of strap or band iron. In order to permit of adjustment of the axis of oscillation of the member 11, the forward ends of the clamp members 7 are formed with pluralities of spaced perforations 12, and the adjacent ends of the member 11 are formed with pluralities of spaced perforations 13, as clearly seen in Fig. 2. These perforations permit of the shifting of the pivot members 10 which may be engaged with any of said perforations. The rearward ends of member 11 are formed at their upper edges with outwardly projecting ears 14, as clearly seen in Figs. 1 and 5, which serve as stops to limit outward swinging of the member 11.

At the outer end of the member 11 is carried the body of the fender which is of substantially rectangular form, the same being formed of a pipe or heavy bar bent into this form, the ends of the pipe being spaced apart to receive the sides of the member 11 between the same. The bight or front portion of the member 11 is vertically enlarged and curved to fit the frame 15, said portion being securely fastened to said frame by a screw 17 as seen in Fig. 3. The ends of the frame 15 are rigidly connected by means of a link or bar 18 the reduced ends of which pass through openings provided in the sides of the member 11 and being threaded into the ends of frame member 15 as illustrated in Fig. 4. The frame is further reinforced by a centrally positioned longitudinally extending bar 19 which is connected at its ends with the respective ends of frame 15, the central portion of the member 19 passing through the sides of member 11, as seen in Fig. 1. In order to prevent injury to the person or object struck by the fender, the frame member 15 is preferably incased or inclosed in a covering 20 of a resilient or cushioning material, rubber hose being preferably used for this purpose.

The fender is normally held in elevated position by means of two helical tension springs 21 which are connected at their front ends with the fender frame, as seen, the rearward ends of said springs being connected with the upwardly projecting ends of the clamp members 8. The arrangement is such, that when the fender strikes an object, causing the fender frame to rock downwardly, the springs 21 will be carried beyond the axis of oscillation of the fender frame, when said springs will serve to hold the frame in a depressed or lowered position, said springs being thus adapted to serve the double function of holding the fender frame in either elevated or depressed position. The ends of the clamp members 8 engaged by the springs are of considerable length and formed with a number of spaced notches or openings for engagement with the springs, which permit of adjustment of the position of the springs relative to the axis of oscillation of the fender frame.

When the fender frame is in depressed position, the same strikes the front wheels 22 of the vehicle, against which the fender frame will be pressed by the springs 21. This pressure upon the wheels of the vehicle will have the action of applying a brake thereto, thus aiding in bringing the vehicle to a sudden stop. At the same time the fender frame rocks downwardly to a position in which the same offers a better guard for the vehicle wheels. At the points of engagement of the fender frame with the wheels, rollers 23 are preferably provided.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination with a vehicle, of a fender therefor comprising a frame connected with the vehicle for swinging on a horizontal axis; helical tension springs cooperating with said frame for holding the same in either elevated or lowered position, said springs, in the swinging of said frame, being arranged to shift from one side of said axis to the other; and means for shifting connections of said springs whereby the positions of the latter relative to said frame axis may be adjusted, substantially as described.

2. The combination with a vehicle, of a fender therefor comprising a frame; means for connecting said frame with the vehicle for vertical swinging, said means comprising a clamp having two interlocking members adapted to embrace a stationary supporting portion of the vehicle, one of said clamp members projecting forwardly for pivotal connection with the fender frame and the other of said clamp members projecting upwardly; and a spring connected with said last mentioned upwardly projecting clamp member for normally holding said frame in elevated position, substantially as described.

3. The combination with a vehicle, of a fender therefor comprising a frame; means for connecting said frame with the vehicle to permit of vertical swinging of said frame, said frame comprising a substantially rectangular body; a substantially U-shaped member connecting said frame with said connecting means, said U-shaped member being connected at its bight with one side of said frame, the ends of said frame terminating intermediate the ends of the sides of said member; and a link connecting the ends of said frame and serving to secure the same to the sides of said U-shaped member, substantially as described.

In testimony whereof I have signed my name to this specification in the presence of two subscribing witnesses.

GORO KAWASAKI.

Witnesses:
JOSHUA R. H. POTTS,
THERESIA M. MUELLER.